ASSOCIATIVE MEMORY WITH VARIABLE WORD LENGTH CAPACITY

Filed Dec. 11, 1964 2 Sheets-Sheet 1

INVENTOR.
EDWIN S. LEE, III
BY
Christie, Parker & Hale
ATTORNEYS

ASSOCIATIVE MEMORY WITH VARIABLE WORD LENGTH CAPACITY

Filed Dec. 11, 1964 2 Sheets-Sheet 2

INVENTOR.
BY EDWIN S. LEE III
Christie, Parker & Hale
ATTORNEYS.

United States Patent Office 3,353,159

Patented Nov. 14, 1967

3,353,159

ASSOCIATIVE MEMORY WITH VARIABLE WORD LENGTH CAPACITY

Edwin S. Lee III, West Covina, Calif., assignor to Burroughs Corporation, Detroit, Mich., a corporation of Michigan Filed Dec. 11, 1964, Ser. No. 417,679
8 Claims. (Cl. 340—172.5)

ABSTRACT OF THE DISCLOSURE

An improved associative memory system wherein the associative logic is implemented along with the rendering of the physical relationship between the information stored in the memory meaningful to allow a word or group of words to be compiled by the programmer.

Figure 1A:
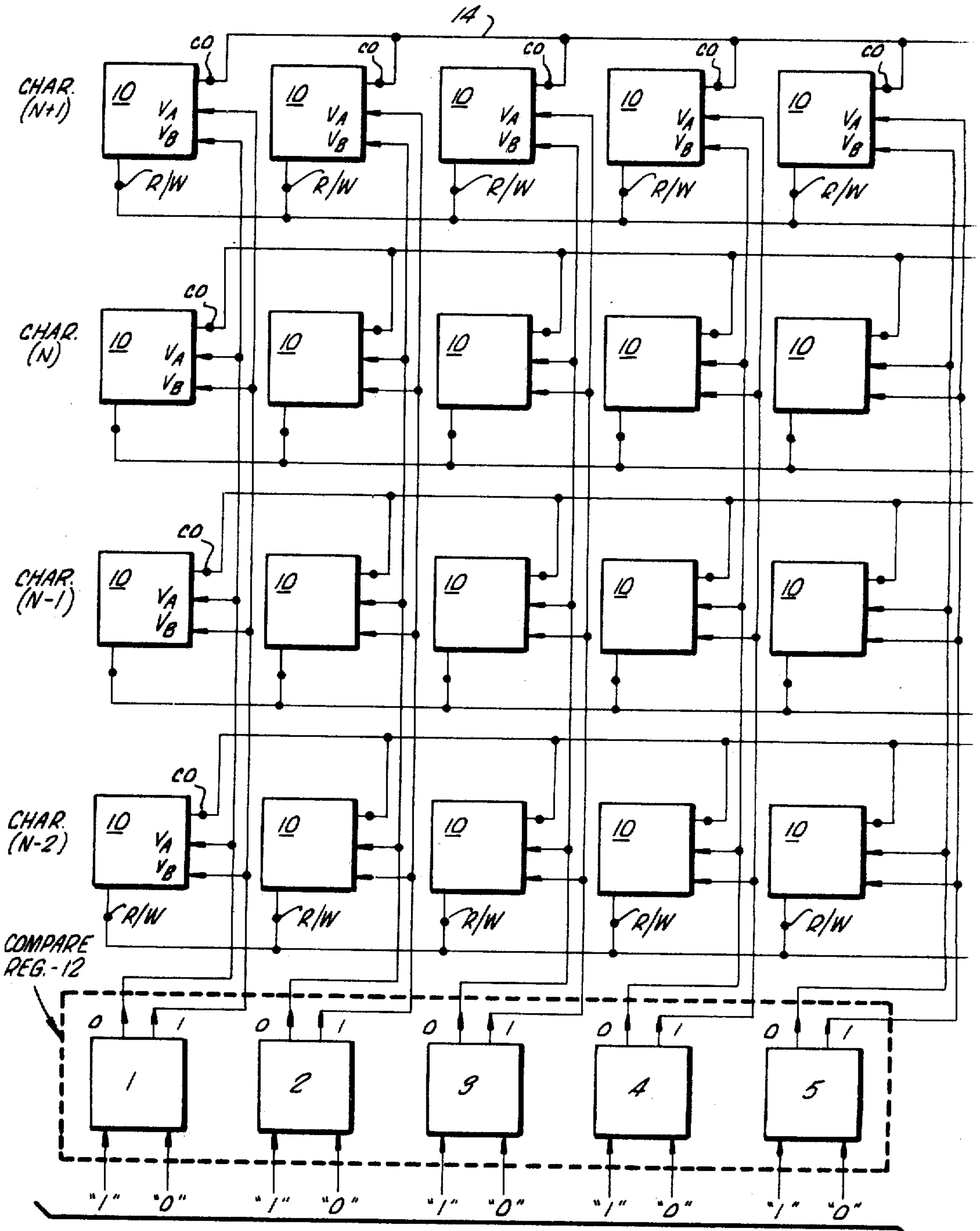

The apparatus and method of the associative memory employs a conventional associative memory and method for interrogating a piece of information stored therein. The information located in the conventional fashion is "marked," the location or locations stored and signalled. Upon re-interrogation, additional information relating the location of the marked information to the new information is included and the associative search is completed with the additional requirement on the word to be read out. These steps can be repeated a number of times to generate a word or groups of words as required by a programmer.

This invention relates to memory systems, and more particularly to improved associative memory systems.

Memories have been developed whereby the information stored in the memory system may be obtained without any indication of the address of a particular piece of information. These memory systems have been variously termed as associative memories, tag memories, or content addressed memories. These memory systems have been constructed and defined whereby a word or tag may be simultaneously applied to all the words or pieces of information in the memory system to determine whether the word exists in the memory or not and, if so, the physical location of the memory is indicated as a result of the comparison. In general, the word stored in this type of memory need not have any relationship to any other word stored in the memory or be located at any particular address in the memory.

In the programming of a digital computer, it becomes necessary to sort out a sequence of characters or words to generate a command for the computer use. Certain characters or pieces of information that are to be used as a unit to define a command may be frequently used together and are best stored in the memory in a sequential order so as to allow ready access thereto for programming use. If this relationship is to be taken advantage of for defining a command, then, the associative memory further requires that the words or characters stored in the memory have some physical relationship with regard to at least one other word or character stored in the memory and that the physical relationship be known to the programmer or user. In this fashion, then, the programmer can compile a command for the computer use by specifying the various words or characters to define a command and their relative physical relationship or lack thereof in the memory so that they may be sequentially read out and employed in the computer.

One such practical example in which an associative memory of this type may be employed is in the generating of computer commands, as is described in the copending application of Paul D. King and Robert S. Barton, Serial No. 84,156 filed Jan. 23, 1961, now Patent Number 3,200,379 and assigned to the same assignee as this application. The aforementioned copending patent application describes an arrangement based on the Polish notation for generating commands. The Polish notation may be readily implemented by the memory system of the present invention in which the characters or words stored in the memory are searched on the basis of their content and/or as well as their physical relationship to one another to define the Polish string required for the solution of any particular problem. Specifically, it may be required to generate a command by specifying a particular character stored in the memory and then locating the character. The characters to be combined with such a character to define a command or string may then be specified as being a character having a known physical relationship or address relative to that character. This physical relationship may be defined as adjacency and further specified as being upper or lower, right or left, depending upon the organization of the memory elements. In specifying the exact physical relationship between the successive characters, the subsequent characters may be read out of the memory system with a minimum of multiple matches.

The present invention then provides an improved associative or content addressed memory system wherein the associative logic is implemented along with the rendering of the physical relationship between words, characters or pieces of information stored in the memory meaningful to generate a word or groups of words such as required in compiling a command for programming use. The arrangement of information in the memory system of combining the associative logic with the physical relationship of the pieces of information in the memory allows variable length words to be stored in the memory and thereby allowing the memory storage to be more efficiently employed. This relationship is further implemented with a minimum of additional circuit elements for use with the conventional associative memory systems. One such associative memory system is described in my copending application Serial No. 278,021 filed on May 6, 1963 and assigned to the same assignee as the present application.

From a method standpoint, the present invention provides an improved associative memory system for compiling a group of characters for defining a preselected word, groups of words, or command including the steps of storing characters or pieces of information in an associative memory comprising the steps of storing preselected characters at an address or location physically related to at least one other character or piece of information in the memory, associatively addressing the memory for reading out a first character therefrom and storing the location of this character in the memory system so as to signal the location thereof, and then addressing the memory for reading out a second character to be compiled with the first character and specifying the physical relationship or address, or lack thereof, with regard to the first character read out from the memory. This physical relationship may comprise a character stored immediately adjacent to the first character read out or having some other predetermined relationship that may be readily specified by the programmer.

From a structural standpoint, the improved associative memory system of the present invention comprises a plurality of associative memory cells arranged in rows and columns for storing binary coded information to be compared. The binary bits of the same binary order are arranged in the same column, and the binary bits comprising a character are arranged in the same memory row. A comparison register for storing a character or a word to be compared with the information stored in the memory cells is also arranged with a plurality of storage cells and having the storage cells of the same binary significance arranged in the same columns as the corresponding memory cells and adapted to be connected to each of the memory cells in the same column for simultaneous comparison purposes. The associative cells are constructed and defined to produce an output indication indicative of the storage state of the cell upon being interrogated, and which output indications are coupled in common to circuit means for indicating a match or mismatch between the stored character and the character stored in the comparison register. The comparison output indications are applied to individual "marking" storage means for each row of memory cells and which "marking" means are connected to be responsive to the comparison output indications of the memory cells of the row for storing a signal indicative of a matching or mismatching character. These individual "marking" storage means coact with individual control means for each row of memory cells which are connected to be responsive to the matching output indications from the individual "marking" storage means having a preselected physical location and a control signal specifying the desired physical relationship of the character previously located in the memory and the subsequent character to be read out of the memory. The individual control means is provided with a control signal source for specifying the desired physical relationship of the two characters to be compiled.

Figure 1:
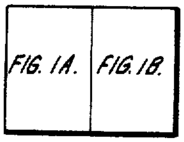
Figure 1B:
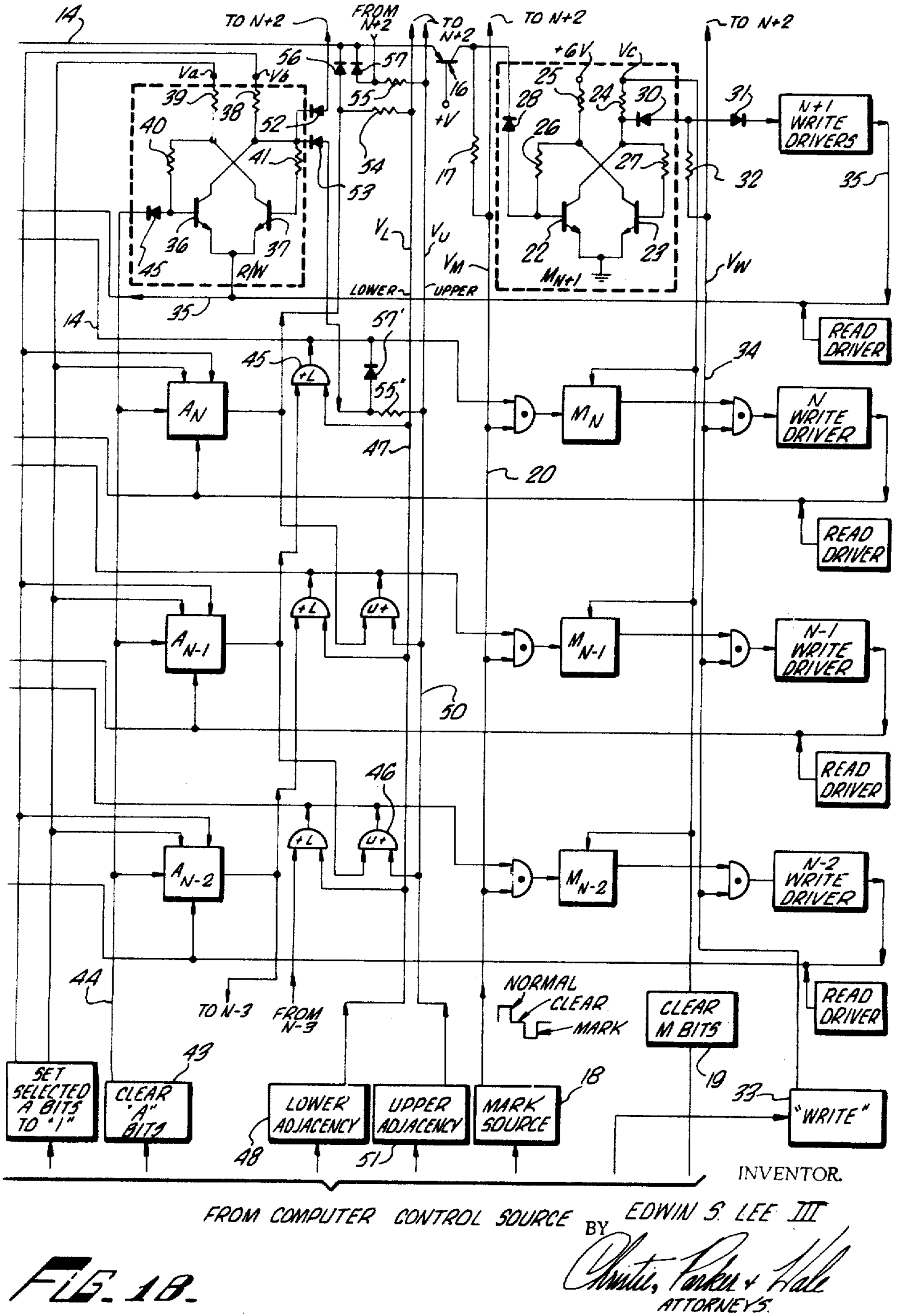

These and other features of the present invention may be more fully appreciated when considered in the light of the following specification and drawing, in which FIG. 1 illustrates the manner of combining FIGS. 1A and 1B to form the sole drawing illustrating a block-circuit diagram of an associative memory system embodying the present invention.

The associative memory system of the present invention employs as an associative memory cell or storage element the associative cell of FIG. 2 described in my copending application Serial No. 278,021 filed on May 6, 1963, and which application is assigned to the same assignee as the present application. The disclosure of said application is incorporated herein by reference. Briefly, the associative memory cell described in the aforementioned copending application is a solid state memory element in the form of a two-transistor flip-flop circuit employing transistors of the PNP type, while the present disclosure employs NPN type transistors. This associative circuit has a common input terminal adapted for receiving read and write control signals and includes a read-out terminal for deriving a signal indicative of the binary storage state of the associative cell without changing the state thereof when a read-out signal of a preselected polarity is applied to the common input terminal. The information to be stored in the associative cell is applied to information terminal means provided for the cell, and which terminal means are connected to the output electrodes of the pair of transistors comprising the associative cell for controlling the conductive conditions of the transistors for storing the desired binary signal in the cell. The associative cell is arranged and defined to write the desired binary signal into the cell only upon the coincidence of the application of the binary signal to the information terminal means and the application of a write signal to the common input terminal. A comparison is effected upon the application of the compare cell signals to the information terminal means to thereby provide a comparison output signal from each memory cell 10 indicative of the matching or mismatching relationship of the pair of bits. To this end, the common input terminal or the read-write terminal is identified in the drawing as R/W. The information terminal means are identified as the input terminals $V_A$ and $V_B$, while the comparison output terminal is identified as the $C_o$ terminal. The read-out terminal is not illustrated. Each of the aforementioned associative memory cells are further identified by the reference numeral 10.

As in conventional associative memory systems, the associative memory cells 10 are arranged in rows and columns for storing the binary coded information. The binary bits of the same binary order are arranged in the same column while the binary bits comprising a character are arranged in the same row, as illustrated.

Merely to facilitate the description of the invention, the pieces of information stored in the associative memory system will be described as comprising characters as the basic piece of information to be operated on in the memory. The term "characters" are used in the sense that they comprise only a portion of a word or command, and in general a plurality of characters are required to compile a word or command. The characters as defined for this purpose, then, comprise five binary bits, and the organization of the memory system as illustrated in the drawing is based on this character definition. It will of course be appreciated that the memory system may be arranged in terms of a word length or in terms of larger or smaller characters for compiling a desired group of words or characters or string of words. Each memory row, then, consists of the five bits comprising a character and two special binary bits for implementing the additional requirement when specifying the physical relationship between characters to be read out of the memory. These characters are identified in the drawing by the storage elements generally identified by the reference characters A and M to correspond with the character identifications of N, N+1, N−1 and N−2, etc.

The comparison register is generally identified by the referenec numeral 12 and includes a plurality of comparison cells for storing the character to be associatively compared with the character stored in the memory cells 10. The compare register may then be of the type described in my aforementioned patent application Serial No. 278,021, and, in particular, the arrangement shown in FIG. 2 therein for controlling the associative cell without utilizing the "don't care" cell illustrated therein. The complementary binary signals derived from each of the comparison cells are connected in parallel circuit relationship, as illustrated, to the $V_A$ and $V_B$ terminals of each memory cell 10 arranged in the same column as the comparison bits. The comparison register 12 comprises the same number of cells that are utilized to define a character, and the five cells are identified by the numerals 1 through 5, reading from left to right, as illustrated. The signals difining a character to be compared are applied to the comparison register 12 from the computer control proper, as is conventional.

It should now be appreciated that the application of the complementary binary signals from each compare cell 12 to the corresponding information terminals $V_A$ and $V_B$ for each memory cell 10 is effective to produce an output signal at the comparison output terminals $C_o$ for each memory cell indicative of a matching or mismatching relationship between the binary signal stored in the memory cell and the corresponding binary signal stored in the comparison cell. Each of the output terminals $C_o$ for the associative memory cells 10 are connected in common by means of a lead wire 14 to a character match detector embodied in the form of a transistor switching circuit 16, as illustrated for the character N+1 in the upper right-hand section of FIG. 1B. The character match detector 16 has its emitter electrode directly connected with the output line 14 and thereby with each of the comparison output, $C_o$, terminals defining an individual character. The base electrode for the detector 16 may be connected to the positive terminal of a source of voltage, while the collector electrode is connected by means of an impedance element illustrated as the voltage dropping resistor 17 having its opposite end connected to a voltage source identified as the mark source 18.

For the purposes of storing the indications of a match or mismatch, the mark source 18 is coupled to each of the detectors individual to the rows of the memory cells 10 and is defined to normally provide a positive potential to each of the individual resistors similar to the resistor 17. Upon excitation for "marking" purposes, from the computer control, the mark source 18 provides a negative voltage level, while a ground level signal is employed to clear the marking elements. The "clear" signal is provided by the source identified as the clear M bits source 19. In this fashion, then, the detector 16 is defined to be in a nonconductive condition when a matching character is located in the corresponding row of memory cells and to be in a conductive condition when a mismatching character exists. To this end, it should be noted that the detector 16 is rendered conductive if any one associative cell 10 mismatches with its corresponding comparison cell. Associated with the detector 16 is a "marking" storage element connected to the output electrode of the detector 16 for storing the matching or mismatching indication of the associated character. These storage elements are identified by the general reference letter M and identify the corresponding character by the sub-letters N, N+1, N—1, etc.

The special bits represented by the A and M storage elements are not of an associative type construction and the circuit details for the $A_{N+1}$ and $M_{N+1}$ storage elements are illustrated in FIG. 1B. Specifically referring to the circuit configuration of the marking storage element $M_{N+1}$, it will be noted that this storage element is a two-transistor flip-flop element of the same general type as the associative memory element 10. The marking storage element M, however, comprises a pair of transistors 22 and 23 having their emitter electrodes connected in common to a point of reference potential or ground. Their collector electrodes are arranged in the usual cross-coupled regenerative fashion with the collector electrode for the transistor 22 being connected to a voltage terminal identified as $V_C$ through a resistive impedance element 24. In the same fashion, the collector electrode for the transistor 23 is connected to a similar resistive impedance element 25 having its opposite terminal connected to a positive supply source of a different potential from that of $V_C$. A cross-coupling resistive impedance element 26 is connected between the collector electrode for the transistor 23 in common with the resistive impedance element 25 and having its opposite terminal connected to the base electrode for the transistor 22. In the same fashion, a cross-coupling resistive impedance element 27 is connected between the base electrode for the transistor 23 and the collector electrode for the transistor 22. The input circuit for the marking storage element M is defined by means of a diode 28 connected to the base electrode for the transistor 22 and to the collector electrode for the detector element 16. The anode electrode for the diode 28 is connected to the base electrode of the transistor 22 while the cathode electrode is directly connected to the detector element 16. The output signals are derived from the marking storage element by means of a diode 30 coupled to the collector electrode for the transistor 22 with its cathode connected thereto and its anode electrode connected as the output terminal. The signal appearing on the output of the diode 30 is indicative of the storage state of the marking storage element and thereby stores or "marks" the matching or mismatching indication provided by the detecting element 16.

The anode electrode for the diode 30 is connected directly to the anode electored for a gating diode 31 having its cathode electrode connected directly to a write driving source, in this instance shown as the N+1 write driver. The diode 31 is included in an AND gating circuit in combination with a dropping resistive impedance element 32 having one terminal connected in common with the diodes 30 and 31 and its opposite terminal connected to a write control source shown as the block 33. The signals derived from the write control source 33 are arranged to normally provide negative voltage signals, and when a write command is applied thereto from the computer control a positive voltage is provided on the write line 34 to each of the connected write resistive elements 32, as illustrated. The coincident combination of a matching output signal from a marking storage element and a write signal causes the associated write driver to be excited and a write signal to be derived at the output terminal of each of the write drivers.

Now referring to the circuit configuration for the A bits, as illustrated for the character N+1, it will be seen that the output signal from the write driver N+1 is applied by means of the lead wire 35 to the common terminal or the read/write terminal for the $A_{N+1}$ storage element. The storage elements are provided to store the matching indications temporarily stored in the marking storage elements M. This transfer allows the marking storage elements M to be cleared for the next comparison step and therefore "mark" the resulting matches. Specifically, the storage element $A_{N+1}$ stores a matching signal when the character N+1 matches the character in the compare register during a comparison operation, as indicated by the marking storage element $M_{N+1}$. This transfer is effected when the write signal from the corresponding write driver, in this instance the N+1 driver, is applied to the read/write terminal for the corresponding A storage element to set it to the appropriate storage state.

These A storage elements are generally similar to the associative cells 10 but have been modified to function as simple storage elements. To this end, each A storage element comprises a two-transistor flip-flop circuit consisting of the transistors 36 and 37. The emitter electrodes for the transistors 36 and 37 are connected in common to function as a common read/write terminal and thereby are connected to receive the write signal from the N+1 write driver. The collector electrode for the transistor 36 is connected by means of a resistive impedance element 38 having its opposite terminal connected to a voltage $V_b$. In the same fashion, the collector electrode for the transistor 37 is connected to a resistive impedance element 39, in turn connected to a voltage terminal $V_a$. A resistive impedance element 40 is cross-connected between the base electrode for the transistor 36 and the collector electrode for the transistor 37. A similar resistive impedance element 41 is cross-connected between the base electrode for the transistor 37 and the collector electrode for the transistor 36. As in the circuit configuration for the associative cells 10, the binary signal stored in the A storage elements are controlled by the application of the voltages to the information terminals $V_A$ and $V_B$. These voltages are applied to the collector electrodes for the transistors in coincidence with a write signal to the common input terminal R/W for writing into the element, as in the associative cells 10. To this end, the terminals $V_A$ and $V_B$ are connected to a voltage source shown as a block 42 further identified as the set selected A bits to 1 block. In the same fashion, the A storage elements may be cleared or set to their normal storage condition, binary 0 state, indicative of a mismatch by means of a signal derived from the block 43 further identified as the clear A bits block. This voltage is applied by the means of a lead wire 44 to each of the A memory elements and is applied as illustrated for the $A_{N+1}$ cell through a diode 45 connected to the base of thetransistor 36.

Prior to describing the remaining system organization for the associative memory system of the present invention, and in order to simplify the explanation thereof, it is best to consider at this point the coaction of the A and M storage elements for "marking" a matching character in memory and the logical gating arrangement provided to identify the desired physical relationship in memory between characters. Referring to the detailed circuit operation of the mark storage elements M initially, it will be noted that the normal potentials applied from the mark source 18 are positive voltages, on the order of +6 volts. This positive potential causes the diode 28 coupled to the input circuit of the mark storage elements to be back-biased, and therefore no current flows through the diode 28. Prior to an operation, the clear M bits source 19 is energized. This momentarily drives the $V_C$ terminal to ground potential from its normal +6 volts level. When $V_C$ is returned to +6 volts, the transistor 23 is cut off and the transistor 22 is conducting and in saturation. In the normal state, then, the conductive and non-conductive conditions of the transistors 22 and 23 are such that with no current flowing through the diode 28 the transistor 22 is placed in a fully conducting condition, while the transistor 23 is placed in a nonconductive condition. This may be considered the binary 0 state. In the same fashion, when a mismatch is indicated by the conduction of the detecting element 16, the current flowing through the collector resistor 17 associated with the element 16 maintains the diode 28 back-biased, and therefore the state of the marking storage element M remains in its normal binary zero state. To change the state of the marking storage elements M to the binary one state for indicating a matching character in a row requires that the element 16 be rendered nonconductive as a result of a matching character being stored in the corresponding row and that a negative potential be applied from the mark source 18. Under these latter voltage conditions, the diode 28 is no longer back-biased, and a current path is provided through the diode 28 and the resistor 17 which renders the transistor 23 conductive while the transistor 22 is placed in a nonconductive condition. This is considered to be the binary one state or the "marked" state.

For the purposes of defining the gating circuit at the input of the mark storage elements, then, the two input AND gate digrammatically illustrated with the elements $M_N$, $M_{N-1}$ and $M_{N-2}$ are defined to include the element 16 providing one of the input signals to the AND gate along with the mark signal, negative voltage level, from the mark source 18 providing the other signal and the output signal being derived at the anode electrode of the diode 28. It should now be appreciated that the matching indication provided along the lines 14 from a matching character in combination with a negative marking signal from the mark source 18 are solely effective to switch the M storage elements to the "marking" or "one" state for storing a match. In the same fashion, the AND gating circuits diagrammatically illustrated with the input of the write drivers N, N−1 and N−2 are defined by the combination of diodes 30, 31 and the resistor 32. The combination of the signal derived from the diode 30 as a result of switching the M storage elements to a marking or matching indication as described hereinabove along with the application of a write signal or a signal of a positive potential along the lead wire 34 to the resistor 32, will cause current to pass through the diode 31 for exciting the associated write driver and thereby provide a write signal at the output thereof appearing on the lead wire 35. It should be noted at this point that the write signal provided on the lead wire 35 is coupled in parallel circuit relationship to the associative cells 10 of the corresponding row as well as the A memory elements. This of course is required to effect the necessary coincident writing into the associative cells 10, as previously mentioned. The write drivers are separately excited (not shown) for writing into the associative cells 10.

The normal conductive and non-conductive conditions of the transistors 36 and 37 defining the A storage elements is such that the transistor 36 is in a fully conducting condition, while the transistor 37 is in a nonconductive condition. To store the matching indication stored in the associated M storage element of the corresponding row requires the application of the write signal from the lead wire 35 to the common R/W terminal along with the excitation of the source 42 for applying the appropriate voltages $V_A$ and $V_B$ for writing a binary 1 into the A cells. When these signals are applied in coincidence, the transistor 36 is rendered nonconductive while the transistor 37 is rendered conductive and will provide an output indication indicative of the corresponding match.

In order to simplify the description of the concept of this invention directed to the combination of the associative logic and the physical relationship of characters stored in the memory, the invention is easiest described if the physical relationship of the characters in memory is considered to be the characters immediately adjacent a matching character located on the previous comparison cycle. Specifically, the physical relationship will now be considered to be a character that has an upper or lower adjacency in regard to the previously matching character. To this end, the upper and lower adjacency is determined by means of a pair of individual two input OR circuits. Specifically, the output indication from an A memory element is applied to both of the OR circuits for determining upper and lower adjacency. Referring to the block identified as $A_{N-1}$, it will be seen that the output indication from this memory element is applied to an OR circuit 45 illustrated adjacent the $A_N$ memory element. In the same fashion, the same output signal is applied to an OR circuit 46 illustrated adjacent the $A_{N-2}$ memory element. The OR circuit 45 further receives a signal from the lead wire 47 which is provided with a signal from the lower adjacency source identified by the block 48. In the same fashion, the OR circuit 46 receives a signal from the lead wire 50 from an upper adjacency source identified as the block 51. The output circuits for the lower and upper adjacency OR circuits 45 and 46, respectively, are connected to provide an output signal along the corresponding lead wires 14 in combination with the signals derived from the $C_0$ terminals of the associative cells 10 and thereby are applied in combination therewith to the AND gates controlling the input signal delivered to the M storage elements.

With the input conditions for the OR circuits 45 and 46 in mind, they can now be related to the specific circuit elements shown in association with the $A_{N+1}$ storage element. In particular, the output terminal for the A memory elements is derived from the collector electrode of the transistor 36 and is connected to the lower and upper adjacency OR circuits. The upper adjacency OR circuit associated with the $A_{N+1}$ storage element comprises the combination of a diode 57, a resistor 55 and a diode (not shown) associated with the $A_{N+2}$ storage element. The diode 57 has its anode electrode connected in common with one end of the resistor 55. The opposite end of the resistor 55 is connected to the upper adjacency common line 50. The signal derived from the $A_{N+2}$ element is coupled to the anode electrode of the diode 57 in combination with the upper adjacency signal to satisfy the input conditions for this upper adjacency OR circuit. The cathode electrode for the diode 57 is connected to the common output line 14 and thereby couples the output signal from this OR circuit to the output line 14. The upper adjacency OR circuit for the $A_N$ storage element also reflects this structure. In the latter OR gate, the diode 57' is coupled in common with a resistor 55' and a diode 53 coupled to the output circuit for the $A_{N+1}$ storage element. The diode 53 has its cathode electrode connected to the collector electrode of the transistor 36 in common with one end of the resistor 41. The anode electrode is coupled to the anode electrode of the diode 57'.

The lower adjacency OR circuit comprises a diode 56, resistor 54 in combination with the signal derived from the next lower storage element, the $A_N$ element. The diode 56 has its cathode electrode connected to the output line 14 and its anode electrode connected in common with one end of the resistor 54 and the signal from the $A_N$ element as illustrated. The opposite end of the resistor 54 is connected to the common lower adjacency line 47. The diode 52 illustrated, connected in common with the output circuit for the $A_{N+1}$ element, is coupled to the lower adjacency OR circuit for the $A_{N+2}$ element (not shown). The polarization of the diode 52 is identical to the diode (not shown) associated with the $A_N$ element and coupling a signal to the diode 56.

The logical conditions for the upper adjacency OR gate are such that a true output results when the diode 57 is back-biased. The diode 57 is back-biased if the cathode of the diode 53 is at ground potential or near ground potential, or if the voltage on the lead wire 50 is near ground level or at a negative level. If neither one of these conditions exists, then a false output signal is derived from the upper adjacency OR circuit indicative that the specified adjacency is false for the corresponding character. The voltage conditions outlined for upper adjacency are also true for the lower adjacency OR circuit with the exception that the lower adjacency source 48 rather than the upper adjacency source 51 provides the desired signals for providing a true output signal.

In summary, then, the logical conditions for effecting a "marking" of the M storage elements to store a matching indication is the provision of a true or matching output indication from each of the associative cells 10 of the same row and a true output signal from both the adjacency OR circuits, if adjacency is specified. If adjacency is not specified, a true output signal will prevail. A false output appearing at any one of the associative cells 10 or at one of the OR circuits will render the element 16 conductive and prevent the "marking" of a match. When the matching conditions are met, the M storage element is switched for indicating a matching condition upon the application of the marking signal from the marking source 18. After the marking storage elements M have been switched, the matching output indication is utilized in combination with the write signal to excite the write drivers for providing a write signal to the A bit storage cells. This write signal is applied in coincidence with the Set selected A bits to 1 signal from the source 42 to switch the corresponding A storage elements. When an A bit cell indicates a match, a true output signal will be provided from the connected upper and/or lower adjacency OR circuits in accordance with the application of the appropriate signals from the sources 51 and 48, respectively.

With the above description of the structural organization of the A and M storage elements as well as the structure defining the lower adjacency OR circuit and the other logical gating arrangements controlling the input of the M storage cell and the N write drivers in mind, it should now be recognized that the blocks illustrated for the characters N, N–1, N–2 correspond identically to the detailed circuit diagrams shown for these elements for the character N+1.

The operation of the associative memory system of the present invention can now be described as it would be employed for combining a group of characters to define a word, command or string as is desired by the programmer. For this purpose it will be assumed that the following characters are stored in the associative cells 10 for comparison with the characters stored in the compare register 12.

| Character | Binary information |
|---|---|
| N+1 | 11111 |
| N | 10101 |
| N–1 | 00001 |
| N–2 | 10101 |

It will also be assumed that the character N–3, which is not illustrated in the drawing, comprises the binary information 01010. It should also be noted that the characters N and N–2 store the same information, so that the application of the binary character 10101 to the compare register 12 should produce two matching output indications. If the physical location of the character undergoing comparison is not specified so as to resolve the multiple matches of this type, it will be recognized by those skilled in the art that a multiple match resolver may be provided for this purpose. A multiple match resolver is not illustrated or described since it is not a portion of this invention. An exemplary multiple match resolver is disclosed and claimed in my earlier filed application bearing Serial No. 213,278, filed on July 30, 1962, and assigned to the same assignee as the present application. The resolution of multiple matches for the purposes of this invention will not be further considered.

It will be further assumed that all of the A and M storage elements have been cleared and they are all indicating a binary zero whereby the normal mismatching output indication is indicated. In the same fashion, the normal signals provided by each of the signal sources will also be assumed to exist. Specifically, the mark source 18 and the write source 33, the Set selected A bits to 1 source 42 and the clear A bits 43 along with the lower adjacency source 48 and the upper adjacency source 51 all apply their normal output signals to their respective output lead wires.

The compare register may now be activated to store the character 10101 in the corresponding compare register cells 1 through 5, as illustrated. At this time, neither the upper nor the lower adjancy is specified for this character in the compare register 12. It should now be appreciated that all of the upper and lower OR circuits provide a true output signal so that an indication of a match or mismatch is solely dependent upon whether all of the associative cells 10 comprising a character match or mismatch. With the switching of the compare register cells to indicate the character 10101, the signals appearing at the $C_0$ terminals of each of the associative cells 10 will immediately indicate the matching or nonmatching condition existing with the corresponding compare register cell. It will be seen from an examination from the above chart of the character content of the memory that under these input conditions the character N and N–2 will match the character in the compare register. Accordingly, at this time a mark signal, a negative voltage level, will be provided from the mark source 18 to cause the corresponding M storage elements or the storage elements $M_N$ and $M_{N-2}$ to be switched for indicating the matching condition. Subsequent to the switching of the M storage elements, a write signal from the write source 33 is applied to each of the AND circuits controlling the input circuits to the write drivers. Accordingly, a write signal will be provided from the N and N–2 write drivers, while the remaining write drivers, the N+1 and the N–1 write drivers, will remain deenergized. Under these sets of conditions, then, the A storage elements corresponding to the characters N and N–2 stored in the associative memory proper will be conditioned to be switched to the binary one state for indicating the location of these matching characters. Upon the application of the write signals to the $A_N$ and the $A_{N-2}$ storage elements, the signals from the Set selected A bits to 1 source 42 will be applied in coincidence with the write signals to switch these cells for indicating the matching output.

With the first comparison cycle completed and the storage of the matching characters indicated at this time by both the A and the M storage elements, the associative memory system is in condition for the next comparison cycle. In the assumed problem, the next character to be entered into the compare register 12 is the character 11111. In addition to specifying this character, it is desired at this time to specify that this character has an upper adjacency relationship with the previous matching characters. At this point, it should be noted that as a result of the first comparison cycle, only the OR circuits coupled to the output indications from the $A_N$ and the $A_{N-2}$ storage elements are in condition to indicate the existence of the desired upper adjacency upon the application of an upper adjacency signal.

It should be noted that prior to the application of the mark signal from the mark source 18 and subsequent to the registering of a new character in the compare register 12, the mark source 18 is excited from the computer control proper to provide a clear signal to the output line 20 which is effective to switch each of the M storage cells to the binary zero state or signalling the normal mismatching state. This step is necessary in order to utilize the marking storage elements for indicating the matching or mismatching relationship for the second comparison cycle as the invention is presently implemented and illustrated.

Examining the characters stored in the associative memory system proper from the above enumeration, it should be noted that all of the characters N through N−3 will produce at least one mismatching output signal, and therefore will indicate a mismatch. The character N+1 will be seen to match bit by bit to produce a true output signal for application to the AND gate controlling the mark storage element $M_{N+1}$.

Since the upper adjacency is specified, the upper adjacency source 51 is excited from the computer control proper to provide the desired upper adjacency signal on the lead wire 50, which is in turn coupled to each of the upper adjacency OR circuits 46. Since only the character N+1 matched as a result of the associative comparison, it will be recognized from the physical relationship of the characters in the memory that only the signals from the $A_N$ storage element need be considered with regard to the upper adjacency OR circuit. Since the physical relationship of the character N+1 as stored in the associative memory is immediately above the storage location of the character N, the desired upper adjacency specified will be seen to exist and therefore the diode 56 coupled to the output lead wire 14 will provide the desired true output signal to maintain the detector 16 in a non-conductive condition. Upon sequential operation, then, of the mark source 18 and the write driver source 33, this matching relationship will be sequentially stored in the $M_{N+1}$ storage element and written into the $A_{N+1}$ storage element upon the coincidence of the signals from the Set selected bits to 1 source 42. None of the other A storage elements, namely the cells $A_N$, $A_{N-1}$ and $A_{N-2}$, will indicate a matching output condition at the end of this second comparison cycle.

The next character to be entered into the compare register 12 is the character 10101. In addition to this new character, the lower adjacency is specified for this third comparison cycle. At this time, then, the mark source 18 is excited to provide a clear signal for switching each of the M storage elements to the normal non-matching stage. Prior to the actual comparison, then, all of the M storage elements and all of the A storage elements with the exception of the $A_{N+1}$ storage element have been set to a non-matching state.

From examining the characters stored in memory from the above chart, it will be seen that strictly on a content basis the characters N and N−2 will produce matching output indications from each of the associative cells 10 defining these characters. However, since the lower adjacency is further specified for locating the desired character, it will also be seen that the character N−2 does not have the desired physical relationship with the previously matching character, namely the character N+1. It is also evident that the desired lower adjacency relationship with the character N+1 is met by the character N, so that the lower adjacency OR circuit connected to the output of the $A_{N+1}$ storage element will produce a true output signal to maintain the detector 16 in the row corresponding to character N in a non-conductive condition. Accordingly, upon the sequential application of the marking signal from the mark source 18, the $M_N$ storage element will be switched to a matching output indication and the compare cycle may be terminated for the purposes of reading the three desired characters from the associative memory in the correct relationship or string. It should now be evident that the grouping of the characters or string comprises the characters N, N+1 and N for use by the computer proper.

What is claimed is:

1. In a content addressed memory system wherein the information stored in the memory may be located by interrogating the memory solely on the basis of simultaneously comparing all of the information bits in the memory with a preselected piece of information for locating the presence or absence of a preselected piece of information in the memory and providing an output indication signalling the matching piece and the location thereof in the memory, the improvement of which comprises means for providing a signal indicative of the physical relationship of another piece of information in the memory relative to the location of the first indicated matching piece, and means for examining the matching indications upon comparing another piece of information with the information stored in the memory and the signal of the desired physical relationship of said first and second pieces to locate the second piece of information from the memory.

2. In a content addressed memory system wherein the information stored in the memory may be located by interrogating the memory solely on the basis of simultaneously comparing all of the information bits in the memory with a preselected piece of information for locating the presence or absence of a preselected piece of information in the memory and providing an output indication signalling the matching piece and the location thereof in the memory, the improvement of which comprises means for storing the matching output indications and providing a signal thereof, means for indicating the physical location of another piece of information relative to the location of one of the stored matching outputs, and means for examining the stored output indications in combination with the signal from said latter means and the matching indications from a subsequent comparison to locate another piece of information in the memory.

3. An associative memory system comprising a plurality of memory cells arranged in rows and columns for storing binary coded information, the binary bits of the same binary order being arranged in the same column and the binary bits comprising a character being arranged in the same row, each of said memory cells including input means for receiving binary coded signals to be associatively compared with the signals stored in the memory cells and being adapted to provide an output indication of the binary state of the cell upon being associatively interrogated, a comparison register comprising a plurality of storage cells for storing binary coded characters to be associatively compared with the characters stored in the memory cells, the comparison cells storing bits of the same binary order being arranged in the same column with the corresponding memory cells and being connected in parallel circuit relationship with the input means for said corresponding memory cells, individual storage means for each row of memory cells connected to be responsive to the output indications of the memory cells of the row comprising a character for storing a signal indicative of a matching or mismatching character, individual control means for each row of memory cells connected to be responsive to the matching output indications from the individual storage means having a preselected physical location and a control signal specifying the physical location of the character to undergo comparison relative to the location of a character stored in memory and whose location is stored by the individual storage means, and a control signal source for specifying the desired physical location of a character to be compared relative to a character stored in memory and connected to each of said individual control means, said individual control means being connected to said storage means for the corresponding row for delivering thereto a signal indicative of a match or mismatch relative to the specified physical location in combination with the output signals from said memory cells.

4. An associative memory system comprising a plurality of memory cells arranged in rows and columns for storing binary coded information, the binary bits of the same binary order being arranged in the same column and the binary bits comprising a character being arranged in the same row, each of said memory cells including input means for receiving binary coded signals to be associatively compared with the signals stored in the memory cells and being adapted to provide an output indication of the binary state of the cell upon being associatively interrogated, a comparison register comprising a plurality of storage cells for storing binary coded characters to be associatively compared with the characters stored in the memory cells, the comparison cells storing bits of the same binary order being arranged in the same column with the corresponding memory cells and being connected in parallel circuit relationship with the input means for said corresponding memory cells, temporary storage means for each row of memory cells connected to be responsive to the output indications of the memory cells of the row comprising a character for temporarily storing a signal indicative of a matching or mismatching character, storage means providing an output indication of the storage state thereof individual to each row of memory cells comprising a character, signal writing means for each row of memory cells connected to be responsive to said temporary storage means for the corresponding row and connected to the individual storage means for writing the matching indications in the corresponding storage means, control means for each row of memory cells connected to be responsive to the output indications from the storage means for each adjacent row and a control signal specifying the physical location of the character to undergo comparison relative to a previous character compared, and a control signal source for specifying the desired physical location of a character to be compared relative to a compared character and connected to each of said individual control means, said control means being connected to said temporary storage means for the corresponding row for delivering thereto a signal indicative of a match or mismatch in combination with the output signals from said memory cells.

5. An associative memory system comprising a plurality of memory cells arranged in rows and columns for storing binary coded information, the binary bits of the same binary order being arranged in the same column and the binary bits comprising a character being arranged in the same row, each of said memory cells including input means for receiving binary coded signals to be associatively compared with the signals stored in the memory cells and being adapted to provide an output indication of the binary state of the cell upon being associatively interrogated, a comparison register comprising a plurality of storage cells for storing binary coded characters to be associatively compared with the characters stored in the memory cells, the comparison cells storing bits of the same binary order being arranged in the same column with the corresponding memory cells and being connected in parallel circuit relationship with the input means for said corresponding memory cells, circuit means individual to each row of memory cells and connected to be responsive to the output indications from each of the memory cells in a row and providing an output signal indicative of a matching or mismatching character, temporary storage means for each row of memory cells connected to be responsive to the output indications of the individual circuit means for temporarily storing a signal indicative of a matching or mismatching character, first control means individual to each row of memory cells connected to be responsive to said matching or mismatching output indications and to said temporary storage means for controlling the storage state thereof in accordance with the received output indication, storage means providing an output indication of the storage state thereof individual to each row of memory cells comprising a character, signal writing means for each row of memory cells connected to be responsive to the storage state of said temporary storage means for the corresponding row and connected to the individual storage means for writing the matching indications in the corresponding storage means, second control means for each row of memory cells connected to be responsive to the output indications from the storage means on opposite sides of the connected memory cells and a control signal specifying the physical location of the character to undergo comparison relative to a previous character compared, and a control signal source for specifying the desired physical location of a character to be compared relative to a compared character, said second control means being connected to said circuit means for the corresponding row for delivering thereto a signal indicative of a match or mismatch relative to the specified physical location in combination with the output signals from said memory cells.

6. An associative memory system as defined in claim 5 wherein said second control means comprising at least a pair of gating elements connected to be individually responsive to said storage means individual to memory cells of a character on opposite sides of the connected memory cells and the corresponding signal from the signal source.

7. Apparatus for compiling a group of characters for defining a preselected word or groups of words including means for storing characters in a content addressed memory including storing preselected characters at an address physically related to at least one other character in the memory, means for addressing the memory for reading out a first character therefrom, means for storing the location of the first character read out from the memory, and means for addressing the memory for reading out of the memory a second character, said latter addressing means including addressing the relationship or lack thereof to the first character to be read out from the memory.

8. Apparatus for compiling a group of characters for defining a preselected word or groups of words including means for storing the characters in a content addressed memory with the characters defining a particular word or groups of words being stored at a preselected address, means for interrogating the memory for reading out a first character therefrom, means for marking the location in memory of the first character read out from the memory, means for specifying the second character to be read out of memory and its location in the memory relative to the first character, and means for interrogating the memory for reading out the specified second character from the memory.

No references cited.

ROBERT C. BAILEY, *Primary Examiner.*

I. S. KAVRUKOV, *Assistant Examiner.*